United States Patent
Womack

(10) Patent No.: US 9,421,696 B2
(45) Date of Patent: Aug. 23, 2016

(54) POLYSTYRENE PRODUCT REMANUFACTURING APPARATUS AND METHODS OF USE

(71) Applicant: Jason Womack, Marietta, GA (US)

(72) Inventor: Jason Womack, Marietta, GA (US)

( * ) Notice: Subject to any disclaimer, the term of this patent is extended or adjusted under 35 U.S.C. 154(b) by 474 days.

(21) Appl. No.: 13/837,057

(22) Filed: Mar. 15, 2013

(65) Prior Publication Data

US 2014/0265041 A1    Sep. 18, 2014

(51) Int. Cl.
| | | |
|---|---|---|
| *B28B 17/00* | (2006.01) | |
| *B29B 17/00* | (2006.01) | |
| *B29K 105/04* | (2006.01) | |
| *B29K 25/00* | (2006.01) | |

(52) U.S. Cl.
CPC ....... *B29B 17/0026* (2013.01); *B29K 2025/06* (2013.01); *B29K 2105/04* (2013.01); *B29K 2105/048* (2013.01); *Y02W 30/62* (2015.05)

(58) Field of Classification Search
CPC .......... B29B 17/0026; B29B 2025/06; B29B 2105/048; B29C 39/24; B29C 39/38; B29C 39/44; B29K 2025/06; B29K 2105/048; B29K 2105/04
USPC .......................................... 209/3; 241/24.28
See application file for complete search history.

(56) References Cited

U.S. PATENT DOCUMENTS

| | | | | |
|---|---|---|---|---|
| 3,598,282 A | * | 8/1971 | Phillips ................. | B29B 13/022 219/421 |
| 3,691,634 A | * | 9/1972 | Buchtel .................. | A61G 15/14 433/79 |
| 3,752,631 A | | 8/1973 | Corbett et al. | |
| 4,030,867 A | * | 6/1977 | Everman ................ | C11D 13/30 219/421 |
| 4,308,447 A | * | 12/1981 | Notzold ................ | B29B 13/022 118/202 |
| 4,771,920 A | * | 9/1988 | Boccagno ............. | B29B 13/022 219/421 |
| 4,898,527 A | * | 2/1990 | Claassen ............... | B29B 13/022 222/53 |

(Continued)

*Primary Examiner* — Alison L Hindenlang
*Assistant Examiner* — Sean S Luk
(74) *Attorney, Agent, or Firm* — Mathew L. Grell; Grell & Watson Patent Attorneys

(57) ABSTRACT

A polystyrene product remanufacturing apparatus includes a cabinet assembly having four or more side walls, including a front panel, two side panels, and a back panel, a top, and a bottom to create an interior space for used polystyrene products, the front panel includes two hinged doors, first door hinges on a vertical edge of the front panel to provide access to the space for placement of used polystyrene products and the second door hinges proximate a lower horizontal edge of the front panel to retrieve densified polystyrene products; a plurality of radiant heat sources for controlled temperature in the cabinet, positioned proximate the top panel, two side panels, bottom panel, and centered above the bottom panel; and two or more drawers positioned proximate bottom panel and removable through the second door.

15 Claims, 7 Drawing Sheets

(56) References Cited

U.S. PATENT DOCUMENTS

| | | | | |
|---|---|---|---|---|
| 5,114,331 A * | 5/1992 | Umehara | B29B 9/06 | 264/916 |
| 5,240,656 A * | 8/1993 | Scheeres | B29B 13/022 | 219/421 |
| 5,346,297 A * | 9/1994 | Colson, Jr. | E05B 47/023 | 312/215 |
| 5,404,935 A * | 4/1995 | Liebermann | A21B 1/10 | 165/48.1 |
| 5,447,685 A * | 9/1995 | Sievert | A61L 11/00 | 241/23 |
| 5,470,521 A * | 11/1995 | Wenzel | B29B 13/022 | 264/321 |
| 5,505,886 A | 4/1996 | Baugh et al. | | |
| 5,645,233 A * | 7/1997 | Chen | B02C 18/142 | 241/100 |
| 5,645,862 A * | 7/1997 | Sable | B29B 13/022 | 222/146.2 |
| 5,657,904 A * | 8/1997 | Frates | B29B 13/022 | 219/421 |
| 5,814,790 A * | 9/1998 | Bondeson | B29B 13/022 | 219/421 |
| 5,972,291 A * | 10/1999 | Healy | A61L 11/00 | 422/122 |
| 6,073,547 A * | 6/2000 | Westbrooks, Jr. | A47J 39/003 | 165/48.1 |
| 6,315,039 B1 * | 11/2001 | Westbrooks, Jr. | A47J 39/006 | 165/201 |
| RE40,290 E * | 5/2008 | Shei | A47J 39/006 | 219/385 |
| 7,571,870 B2 * | 8/2009 | Langston | B07B 13/00 | 100/315 |
| 7,967,595 B1 * | 6/2011 | Schofield | B29B 17/0026 | 425/384 |
| 8,202,077 B2 * | 6/2012 | Major | B29B 17/0047 | 222/146.2 |
| 8,322,640 B2 * | 12/2012 | Langston | B02C 23/18 | 241/100 |
| 8,407,914 B2 * | 4/2013 | Hollinger | D06F 58/10 | 223/85 |
| 2003/0047553 A1 * | 3/2003 | Patti | F24C 7/082 | 219/400 |
| 2005/0231915 A1 * | 10/2005 | Keenan | H05K 7/20572 | 361/700 |
| 2006/0049172 A1 * | 3/2006 | Gagas | F24C 15/18 | 219/521 |
| 2006/0174782 A1 * | 8/2006 | Walker | B29B 17/0026 | 100/305 |
| 2008/0223758 A1 * | 9/2008 | Scheeres | B09B 3/0033 | 209/3 |
| 2008/0256826 A1 * | 10/2008 | Zarembinski | D06F 58/10 | 34/562 |
| 2010/0140251 A1 * | 6/2010 | Shei | A61B 3/00 | 219/430 |
| 2010/0239704 A1 | 9/2010 | Major | | |
| 2010/0282097 A1 * | 11/2010 | Schulte | A21B 1/245 | 99/476 |
| 2010/0300130 A1 * | 12/2010 | Shoenfeld | A61B 19/0248 | 62/129 |
| 2011/0151072 A1 * | 6/2011 | Anderson | F24C 7/082 | 426/231 |
| 2011/0259864 A1 * | 10/2011 | Galietti | H05B 3/0033 | 219/201 |
| 2012/0180776 A1 * | 7/2012 | Newsom | F24C 15/022 | 126/197 |
| 2014/0083309 A1 * | 3/2014 | Reese | A47J 39/003 | 99/474 |
| 2014/0131345 A1 * | 5/2014 | Watson | H05B 6/129 | 219/620 |
| 2014/0227402 A1 * | 8/2014 | Tan | A47J 39/006 | 426/231 |
| 2014/0261369 A1 * | 9/2014 | Tyler | F24C 15/34 | 126/1 F |
| 2015/0118340 A1 * | 4/2015 | Tuck | B29C 39/24 | 425/144 |
| 2015/0237908 A1 * | 8/2015 | Burkett | A23L 3/003 | 426/231 |

* cited by examiner

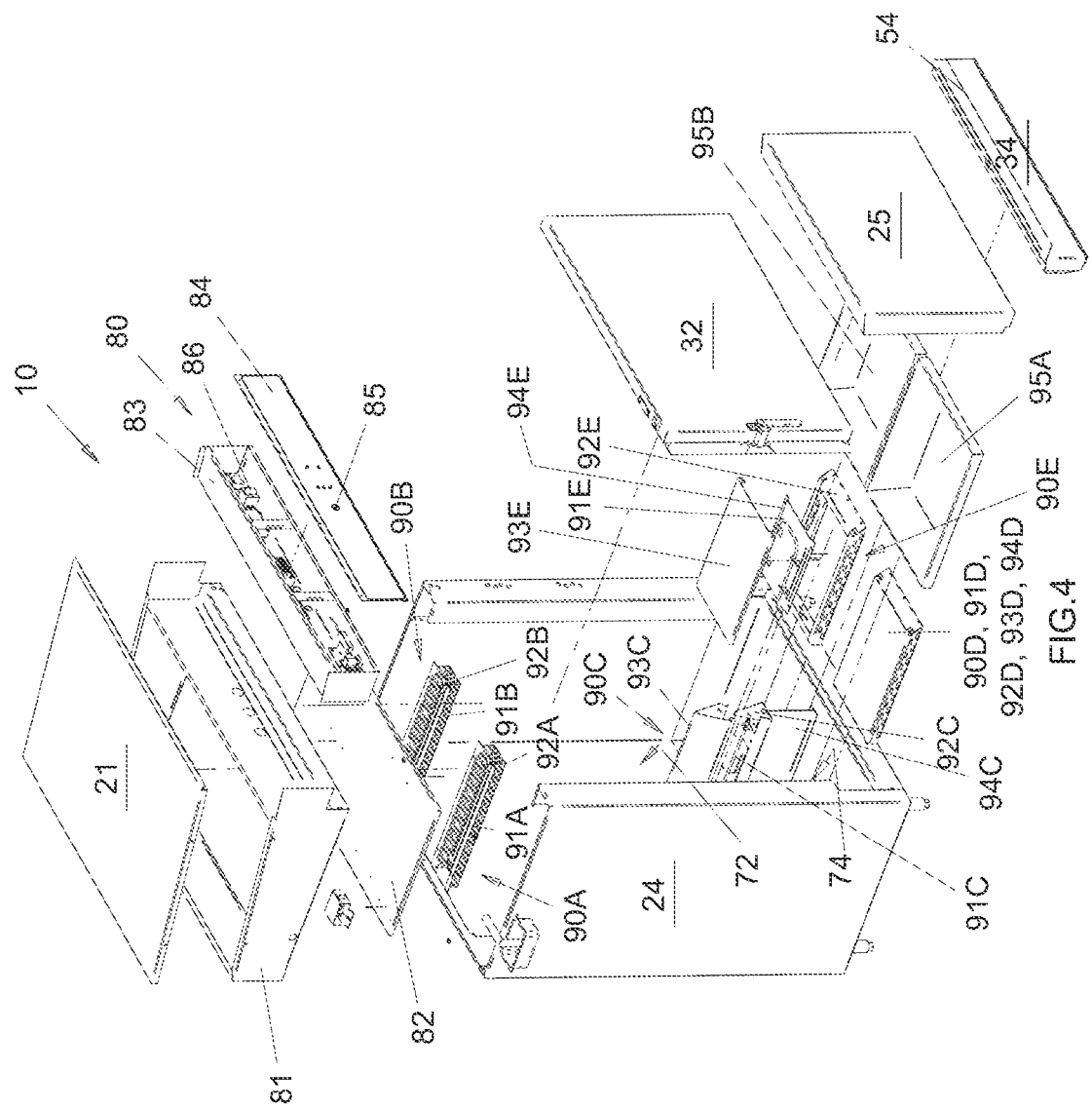

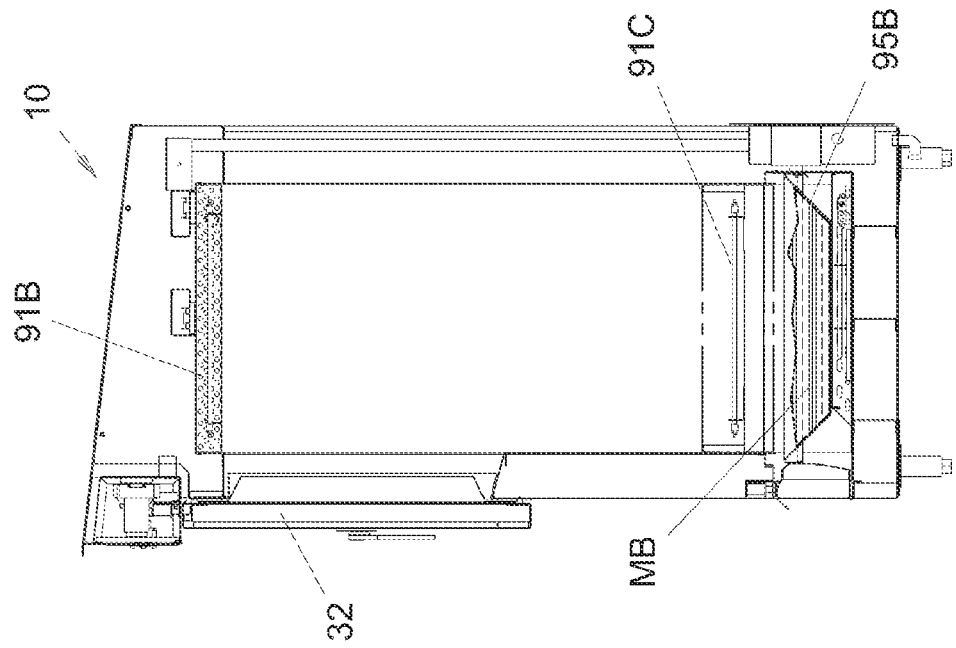
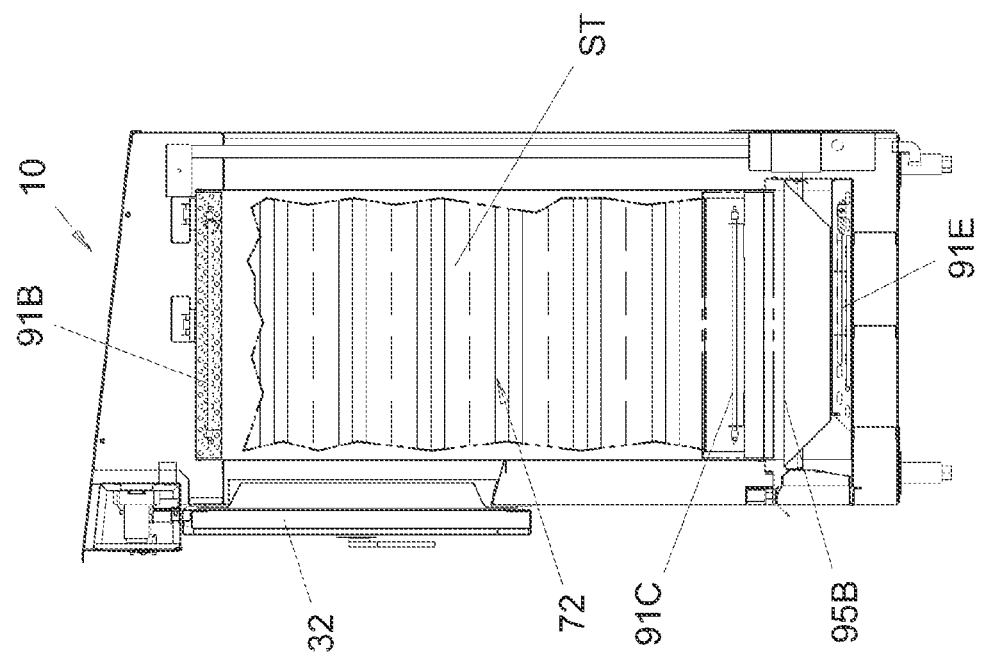

POLYSTYRENE PRODUCT REMANUFACTURING APPARATUS AND METHODS OF USE

TECHNICAL FIELD

The disclosure relates generally to an enclosed heat source or oven, and more specifically is related to a heating apparatus for modifying the shape and density of plastic.

BACKGROUND

Polystyrene or Styrofoam products are widely used in the food service industry such as cafeteria's and lunch rooms for serving food and drink. Presently, in the cafeteria/lunchroom settings used Styrofoam trays and containers are disposed of by dumping the products along with the remaining food left on the product into a garbage bag and dispose of the tray and food content. Despite the suitability of Styrofoam for these purposes, the cost of its disposal along with the environmental impact has become of concern. Polystyrene has beneficial characteristics such as it is light weight and high strength; however, once used it is not easily compressed and does not have enough density to make transportation to a central recycling center economical due to the large space the un-stacked used containers and trays occupy.

Various cabinets or insulated cabinets with internal heat sources are known in the prior art, for example, there are BBQ grills, cookers or smokers, ventilating and cooling (HVAC) units, and wall ovens. Each cabinet houses a heat source and serves a purpose of efficiently heating an item for a special purpose.

One such purpose is densification of plastic, polymers, or polymer materials such as polystyrene since expanded polystyrene is a thermoplastic polymer and heat quickly causes the polymer chains to retract or shrink.

Two processes for densification of polystyrene include compression and melting. Large commercial or industrial recyclers have conveyor delivery system, large hoppers, shredders, heat sources, and compression devices to remanufacture polystyrene. However, such facilities require bulk quantities of polystyrene to be transported to the facility, require substantial space requirements for such equipment, and generate undesirable amounts of fumes.

Therefore, it is readily apparent that there is a recognizable unmet need for a polystyrene product remanufacturing apparatus and methods of use, which enables remanufacturing of large numbers of expanded polymer container, packaging, or tray at the source of the used items, such as, a single school or cafeteria, fast food restaurant or similar location having a high volume of used expanded polymer containers, packaging or trays resulting in an enormous space when un-stacked, and enables remanufacturing the expanded polystyrene into dense retracted blocks, which are efficient to transport.

BRIEF SUMMARY

Briefly described, in example embodiment, the present apparatus overcomes the above-mentioned disadvantage, and meets the recognized need for a polystyrene product remanufacturing apparatus and methods of use comprising, in general, a cabinet assembly having four or more side walls, including a front panel, two side panels, and a back panel, a top, and a bottom to create an interior space for used polystyrene products, the front panel includes two hinged doors, first door hinges on a vertical edge of the front panel to provide access to the space for placement of used polystyrene products and the second door hinges proximate a lower horizontal edge of the front panel to retrieve densified polystyrene products; a plurality of radiant heat sources for controlled temperature in the cabinet, positioned proximate the top panel, two side panels, bottom panel, and centered above the bottom panel; and two or more drawers positioned proximate bottom panel and removable through the second door, and, thus, functions to enable remanufacturing of large numbers of expanded polymer packaging or trays at the source, such as, a single school or cafeteria, fast food restaurant or similar location having a high volume of used expanded polymer packaging or trays resulting in an enormous space when un-stacked, and remanufacturing the expanded polystyrene into a dense retracted blocks that are efficient to transport.

According to its major aspects and broadly stated polystyrene product remanufacturing apparatus and methods of use comprising, in general, a polystyrene tray remanufacturing apparatus and methods of use comprising, in general, an cabinet assembly having four or more side walls, including a front panel, two side panels, and a back panel, a top, and a bottom to create a space for used polystyrene products, the front panel includes two hinged doors, first door hinges on a vertical edge of the front panel to provide access to the space placement of used polystyrene products and the second door hinges proximate a lower horizontal edge of the front panel to retrieve densified polystyrene products; a plurality of radiant heat sources for controlled temperature in the cabinet, positioned proximate the top panel, two side panels, bottom panel, and centered above the bottom panel; and two or more drawers positioned proximate bottom panel and removable through the second door.

In a preferred embodiment, an apparatus for the densification of thermoplastics, the apparatus including a cabinet assembly having a plurality of side walls, a top, and a bottom, the cabinet assembly configured to create an interior space, at least one door configured to provide access to the interior space, a plurality of radiant heat sources configured for controlled temperature in the interior space, and wherein the plurality of radiant heat sources includes one or more upper radiant heat source positioned to radiate heat from an upper portion of the interior space adjacent the top, the plurality of radiant heat sources further includes one or more lower radiant heat source positioned to radiate heat from a lower portion of the interior space adjacent the bottom, and the plurality of radiant heat sources still further includes at least one middle radiant heat source positioned to radiate heat from a center portion of the interior space adjacent a point between the top and the bottom.

In still a further exemplary embodiment of a method of densification of a plurality of thermoplastics, the method including the steps of obtaining an apparatus having a cabinet assembly configured with a plurality of side walls, a top, and a bottom, the cabinet assembly configured to create an interior space, at least one door configured to provide access to the interior space, a plurality of radiant heat sources configured for controlled temperature in the interior space, wherein the plurality of radiant heat sources includes one or more upper radiant heat source positioned to radiate heat from an upper portion of the interior space adjacent the top, the plurality of radiant heat sources further includes one or more lower radiant heat source positioned to radiate heat from a lower portion of the interior space adjacent the bottom, and the plurality of radiant heat sources still further includes at least one middle radiant heat source positioned to radiate heat from a center portion of the interior space adjacent a point between the top and the bottom, and wherein the interior space includes one or more collector trays, inserting the plurality of thermoplastics therein the interior space, completing one or more pre-operation procedures, powering the plurality of radiant heat sources to achieve a temperature equivalent to the melting point of the plurality of thermoplastics, densifying the plurality of thermoplastics, and collecting the densified plurality of thermoplastics in the collector trays.

Accordingly, a feature of the polystyrene product remanufacturing apparatus and methods of use is its ability to provide a front loading access door to enable easy loading of used polystyrene products.

Another feature of the polystyrene product remanufacturing apparatus and methods of use is its ability to have a front retrieval access door to enable easy unloading of densified polystyrene products.

Still another feature of the polystyrene product remanufacturing apparatus and methods of use is its ability to provide an insulated energy efficient apparatus to for densification of used polystyrene products.

Yet another feature of the polystyrene product remanufacturing apparatus and methods of use is its ability to integrate a safety control system with solenoid door locks.

Yet another feature of the polystyrene product remanufacturing apparatus and methods of use is its ability to provide a small foot print remanufacturing apparatus utilized to densify used polystyrene products at the source such as, a single school or cafeteria, fast food restaurant or similar location having a high volume of used expanded polymer containers, packaging or trays.

Yet another feature of the polystyrene product remanufacturing apparatus and methods of use is its ability to provide transportation cost savings by remanufacturing the expanded polystyrene into dense retracted blocks, which are efficient to transport.

Yet another feature of the polystyrene product remanufacturing apparatus and methods of use is its ability to provide a remanufacturing apparatus with a control system with three position operation switches.

Yet another feature of the polystyrene product remanufacturing apparatus and methods of use is its ability to provide a side or back vent for discharge of fumes generated during densification of used polystyrene products.

Yet another feature of the polystyrene product remanufacturing apparatus and methods of use is its ability to densify or retract the used polystyrene product by approximately ninety percent (90%) reducing the cost to transport and recycle or dispose of the used polystyrene product.

These and other features of the polystyrene product remanufacturing apparatus and methods of use will become more apparent to one skilled in the art from the following Detailed Description of the Embodiments and Claims when read in light of the accompanying drawing Figures.

BRIEF DESCRIPTION OF THE DRAWINGS

The polystyrene product remanufacturing apparatus and methods of use will be better understood by reading the Detailed Description of the embodiments with reference to the accompanying drawing figures, in which like reference numerals denote similar structure and refer to like elements throughout, and in which:

FIG. 4 is perspective exploded view of polystyrene product remanufacturing apparatus of FIG. 1;

FIG. 7 is a side view of the polystyrene product remanufacturing apparatus of FIG. 1, shown with used product positioned therein;

FIG. 8 is a side view of the polystyrene product remanufacturing apparatus of FIG. 1, shown with used product densified and retracted into a melted block.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1-9 specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Figure 1:
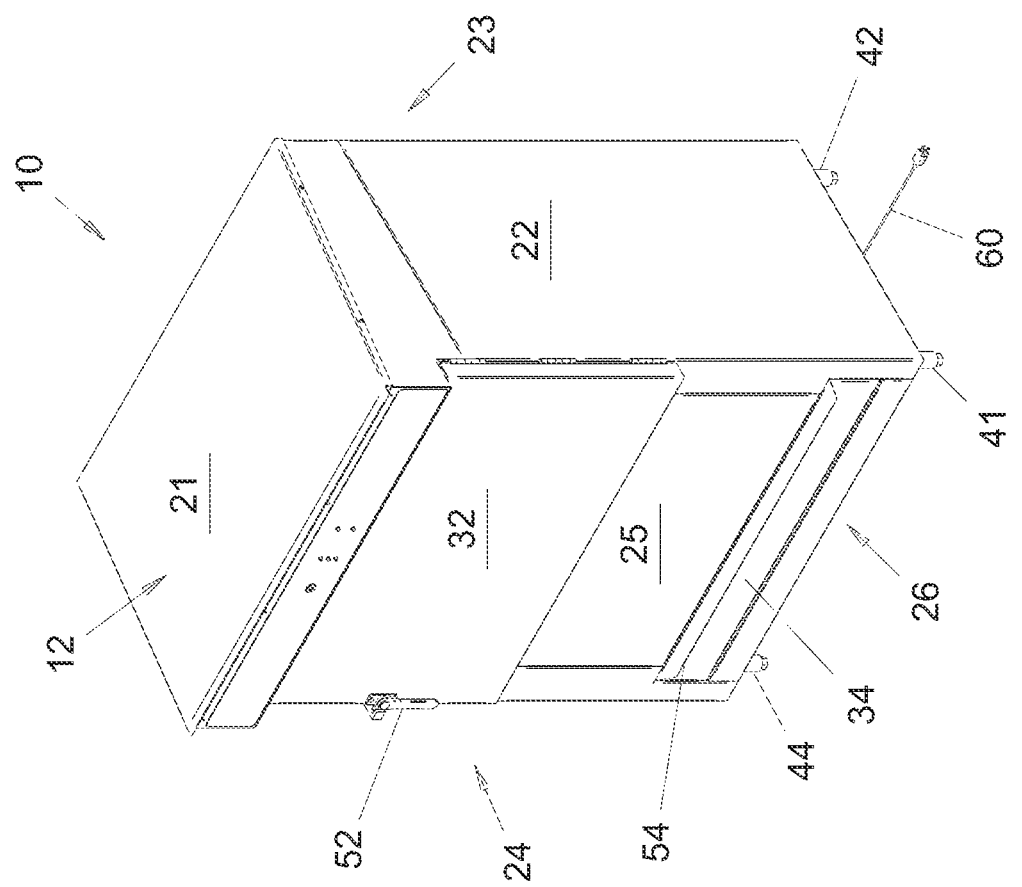
FIG. 1 is a perspective view of an example embodiment of polystyrene product remanufacturing apparatus.
Figure 2:
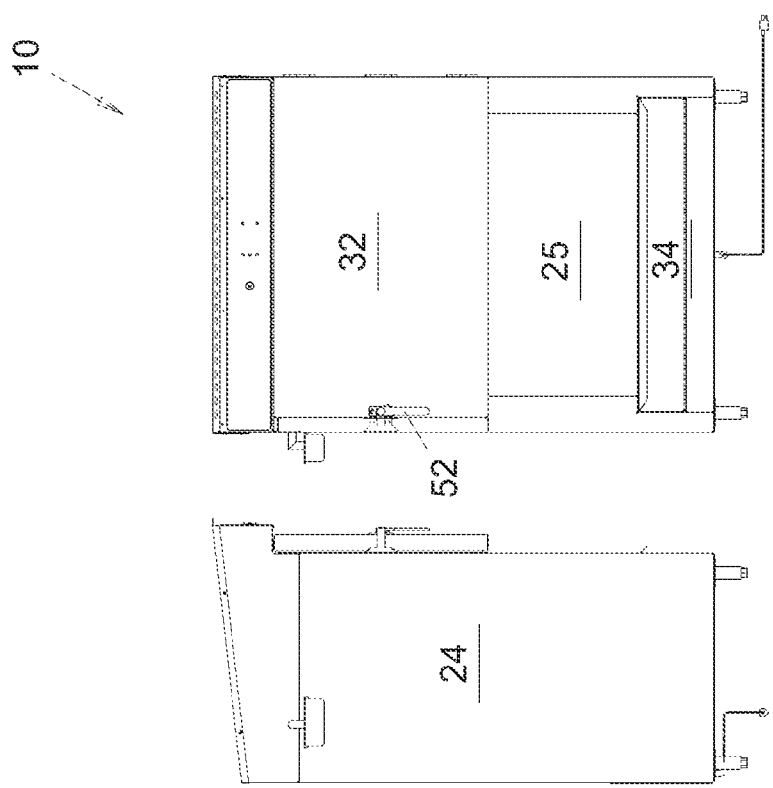
FIG. 2 is a left side, front side, right side, and back side view of the polystyrene product remanufacturing apparatus of FIG. 1.
Figure 3:
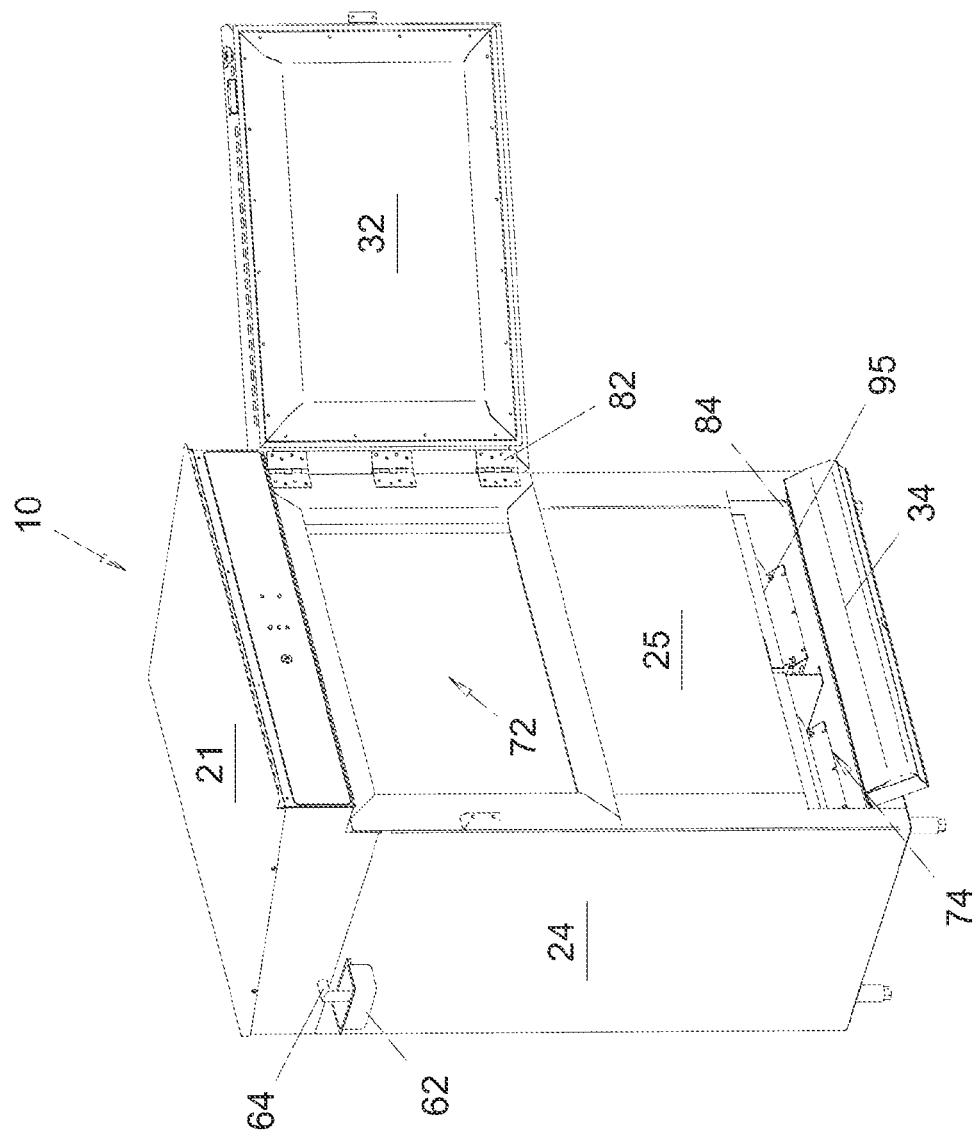
FIG. 3 is a perspective view of the polystyrene product remanufacturing apparatus of FIG. 1, shown with front panel doors in the open position.

Referring now to FIGS. 1-3, by way of example, and not limitation, there is illustrated an example embodiment of a polystyrene product remanufacturing apparatus 10. Preferably, remanufacturing apparatus 10 preferably includes cabinet assembly 12 configured of four or more side wall sections and top and bottom, including front panel 25, two side panels, left side panel 24 and right side panel 22, back panel 23, top panel 21, and bottom panel 26 to create an enclosed and insulated space therein. It is contemplated herein that cabinet assembly 12 may include an internal or external support structure to provide support for side wall sections and a top and bottom. Moreover, assembly of cabinet assembly 12 may be assembled by welding or screwing the component together or other attachment device known to one of ordinary skill in the art. Furthermore, bottom panel 26 preferably includes a plurality of legs or feet, such as foot plate assemblies 40, including first foot plate assembly 41, second foot plate assembly 42, third foot plate assembly 43, and fourth foot plate assembly 44. Moreover, foot plate assemblies 40 may include wheels, such as casters to enable repositioning of polystyrene product remanufacturing apparatus 10. It is further contemplated herein that cabinet assembly 12 preferably includes insulation, such as rock wool to insulate cabinet assembly 12 in an effort to reduce heat transfer, reduce energy consumption, and hot surface safety concerns. It is still further contemplated herein that conduit runs and junction boxes may be positioned internal or external to cabinet assembly 12 to enable power, wiring, sensors, and controls to be positioned therein cabinet assembly 12.

Still furthermore, cabinet assembly 12 preferably includes one or more door assemblies 30 releasably hinged thereto front panel 25, such as first, upper, or top door assembly 32 is preferably releasably hinged to a vertical edge of the front panel 25 and is releasably latched via door latch bracket 52 to front panel 25 and door latch bracket 52 is preferably positioned on an opposite edge of vertical edge of the front panel 25. Preferably first door assembly 32 provides access to upper interior cabinet space for placement or stacking of used polystyrene products therein cabinet assembly 12. Second, lower, or bottom door assembly 34 is preferably releasably hinged to front panel 25 and provides access to lower interior cabinet space 74 for insertion and/or removal of pan or tray, such as collector tray 95 therefrom cabinet assembly 12. Bottom door assembly 34 preferably includes lower door handle 54 for operation of bottom door assembly 34.

Cabinet assembly 12 preferably includes one or more access panel 54 positioned preferably on back panel 23, however any of the other panels of cabinet assembly 12 may include access panel 54.

Cabinet assembly 12 is preferably formed of a suitable material, such as stainless steel, aluminum, tin, iron, rigid plastic or plastic with metal inserts for strength, fiber, metal, alloy, steel, or the like, capable of providing structure to polystyrene product remanufacturing apparatus 10. Preferably, the material includes other suitable characteristics, such as durability, rust-resistance, light weight, heat-resistance, chemical inertness, oxidation resistance, ease of workability, or other beneficial characteristic understood by one skilled in the art.

It is contemplated herein that sections or integral sections of shaped cabinet assembly 12 may include various configurations, angles, and sizes and such sections or combination sections may be arranged proximate one another to fit together to form cabinet assembly 12.

It is further contemplated herein that first, upper, or top door assembly 32 is configured to enable easy loading of used polystyrene products, such as stacked trays ST as shown in FIG. 7.

It is further contemplated herein that second, lower, or bottom door assembly 34 is configured to enable easy unloading or retrieval of densified polystyrene products, such as melted brick MB as shown in FIG. 8.

Figure 6:
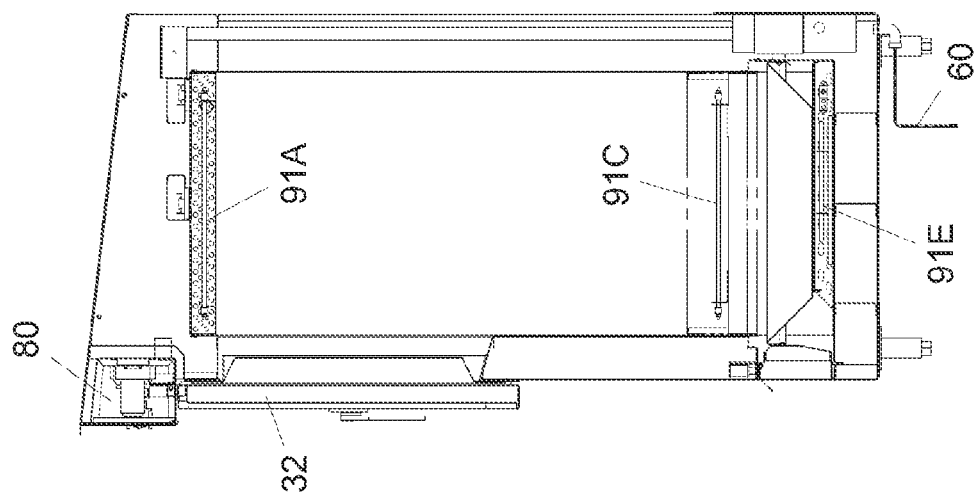
FIG. 6 is a side view of the polystyrene product remanufacturing apparatus of FIG. 1, showing the positioning of the plurality of heating elements.
Figure 5:
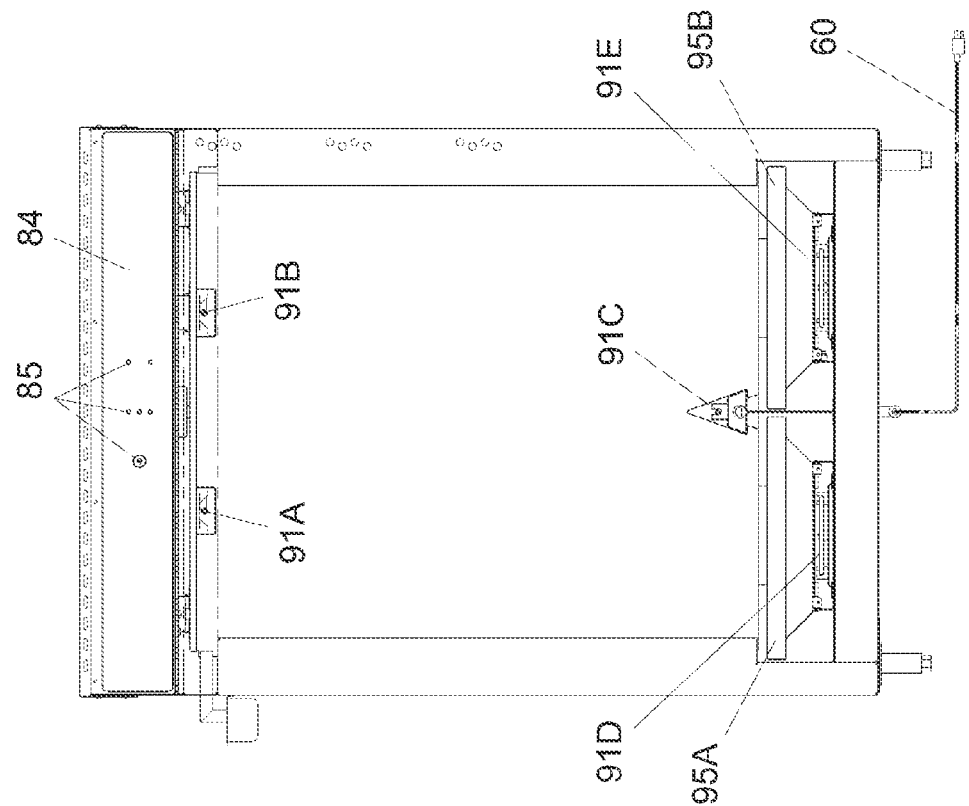
FIG. 5 is a front view of the polystyrene product remanufacturing apparatus of FIG. 1, showing the positioning of the plurality of heating elements.

Referring now to FIGS. 4-6, by way of example, and not limitation, there is illustrated an example embodiment of a polystyrene product remanufacturing apparatus 10. Preferably polystyrene product remanufacturing apparatus 10 further includes control panel assembly 80 having control panel 81 and bottom panel 82, and positioned therein control housing 83 having control panel cover 84. Control housing 83 preferably includes controls 86 configured to operate polystyrene product remanufacturing apparatus 10. Controls 86 preferably include wiring, sensor, regulators, timers, electronics, solenoid door locks, thermostats, communications equipment, lights, key switch, actuators, transformer and the like necessary to operate and control polystyrene product remanufacturing apparatus 10. Control panel cover 84 preferably includes one or more operators, such as buttons, switches, lights and the like necessary to operate and control polystyrene product remanufacturing apparatus 10.

Preferably polystyrene product remanufacturing apparatus 10 further includes ventilation assembly 60 having ventilation conduit 64 and reservoir 62. Ventilation assembly 60 is preferably positioned with ventilation conduit 64 having access to upper interior cabinet space 72 anywhere on cabinet assembly 12 four or more side wall sections and top and bottom. Preferably ventilation assembly 60 is configured to vent any fumes, gases, or moisture accumulating within upper interior cabinet space and/or lower interior cabinet space 74. It is contemplated herein that ventilation assembly 60 may include a fan and duct work necessary to vent any fumes, gases, or moisture accumulating within upper interior cabinet space 72 and/or lower interior cabinet space 74 to an exterior position, such as outside a building.

Preferably polystyrene product remanufacturing apparatus 10 further includes a plurality of radiant heat elements 90 strategically positioned or disposed within upper interior cabinet space 72 and/or lower interior cabinet space 74 of cabinet assembly 12. Preferably heat elements 90 are configured with controls 86 to regulate and maintain specified temperature within upper interior cabinet space 72 of cabinet assembly 12. Moreover, heat elements 90 include first upper heat element 91A and second upper heat element 91B positioned proximate top panel 21 or bottom panel 82 of control panel assembly 80 or proximate an upper portion of upper interior cabinet space 72. First upper heat element 91A and second upper heat element 91B preferably radiate heat from above upper interior cabinet space 72 and/or lower interior cabinet space 74 to therein such space. Furthermore, first upper heat element 91A and second upper heat element 91B preferably include heating element covers, such as first heating element cover 92A and second heating element cover 92B to affixed around first upper heat element 91A and second upper heat element 91B to prevent debris from contacting first upper heat element 91A and second upper heat element 91B.

Moreover, heat elements 90 include first lower heat element 91D and second lower heat element 91E positioned proximate bottom panel 26. First lower heat element 91D and second lower heat element 91E preferably radiate heat from below upper interior cabinet space 72 and/or lower interior cabinet space 74 to therein such space. Furthermore, first lower heat element 91D and second lower heat element 91E preferably include heating element covers, holders and/or mounting plates, such as first heating element cover 93D and second heating element cover 93E to cover first lower heat element 91D and second lower heat element 91E to prevent debris from contacting first lower heat element 91D and second lower heat element 91E; including first heating element holder 92D and second heating element cover 92E to support first lower heat element 91D and second lower heat element 91E; and including first heating element mounting plate 94D and second heating element mounting plate 94E to mount first lower heat element 91D and second lower heat element 91E thereto.

Moreover, heat elements 90 include middle heat element 91C positioned preferably proximate bottom panel 26 and affixed to pan divider 94C, pan divider 94C preferably configured to extend therefrom bottom panel 26 into upper interior cabinet space 72 and/or lower interior cabinet space 74. Middle heat element 91C preferably radiates heat from below upper interior cabinet space 72 and above lower interior cabinet space 74 to therein such space. Furthermore, middle heat element 91C preferably includes heating element covers, holders and/or mounting plates, such as heating element cover 93C to cover middle heat element 91C to prevent debris from contacting middle heat element 91C; including middle element holder 92C to support middle heat element 91C therefrom pan divider 94C. Still further, heating element cover 93C is preferably configured as a center divider of lower interior cabinet space 74 dividing stacked trays ST transitioning to melted brick MB (as shown in FIGS. 7-8) between collector trays 95, such as first collector tray 95A and second collector tray 95B. Moreover, middle heat element 91C and heating element cover 93C is preferably configured as a center divider of lower interior cabinet space 74 dividing stacked trays ST transitioning to melted brick MB (as shown in FIGS. 7-8), thus, efficiently transitioning dividing stacked trays ST to melted brick MB by providing a heat source that radiates from upper interior cabinet space 72. It is further contemplated herein that pan divider 94C may be of a size capable of positioning middle heat element 91C anywhere in the center column between first upper heat element 91A and second upper heat element 91B, and first lower heat element 91D and second lower heat element 91E.

It is contemplated herein that other collector trays may be configured for cabinet assembly 12, such as a single tray or the like.

It is recognized herein that a plurality of radiant heat elements 90 are strategically positioned within upper interior cabinet space 72 to achieve optimum balance of heat throughout upper interior cabinet space 72 and/or lower interior cabinet space 74 of cabinet assembly 12.

It is recognized herein that a plurality of radiant heat elements 90 are strategically positioned therein upper interior cabinet space 72 to supply sufficient heat to cause stacked trays ST to retract, densify, or melt into brick MB (as shown in FIGS. 7-8).

It is recognized herein that a plurality of radiant heat elements 90 are strategically positioned around stacked trays ST (as shown in FIG. 7).

Preferably polystyrene product remanufacturing apparatus 10 further includes power cord and plug 60 to connect polystyrene product remanufacturing apparatus 10 thereto electric service.

It is contemplated herein that controls 86 integrated and are in communication with solenoid door locks of door latch bracket 52 to provide safety control system disabling door latch bracket 52 when temperatures exceed a specified level.

It is contemplated herein that collector tray 95 may be positioned, slid or rolled therein/out of lower interior cabinet space 74 via opening and/or closing of bottom door assembly 34.

Referring now to FIGS. 7-8, by way of example, and not limitation, there is illustrated cut away of an example embodiment of a polystyrene product remanufacturing apparatus 10. Preferably polystyrene product remanufacturing apparatus 10 is shown with stacked trays ST inserted therein upper interior cabinet space 72 of cabinet assembly 12. Stacked trays ST preferably include polymers, polymer materials, thermo plastics, or expanded polymer, such as polystyrene including containers, packaging, or trays. In use a plurality of radiant heat elements 90 strategically positioned or disposed within upper interior cabinet space 72 of radiate heat to achieve a temperature equivalent to the melting point of stacked trays ST, such as approximately 375 degrees Fahrenheit. Such temperature will cause stacked trays ST to retract and densification into melted block MB reducing stacked trays ST volume by approximately ninety percent (90%) reducing the cost to transport and recycle or dispose of the used polystyrene product.

It is contemplated herein that collector trays 95, such as first collector tray 95A and second collector tray 95B collect or amass densified stacked trays ST or stacked trays ST in a retracted and densification form as melted block MB.

It is contemplated herein that cabinet assembly 12 configured of four or more side wall sections and top and bottom may include one or more vents to exhaust heat from within cabinet assembly 12 or to discharge fumes generated during densification of used polystyrene products.

Figure 9:
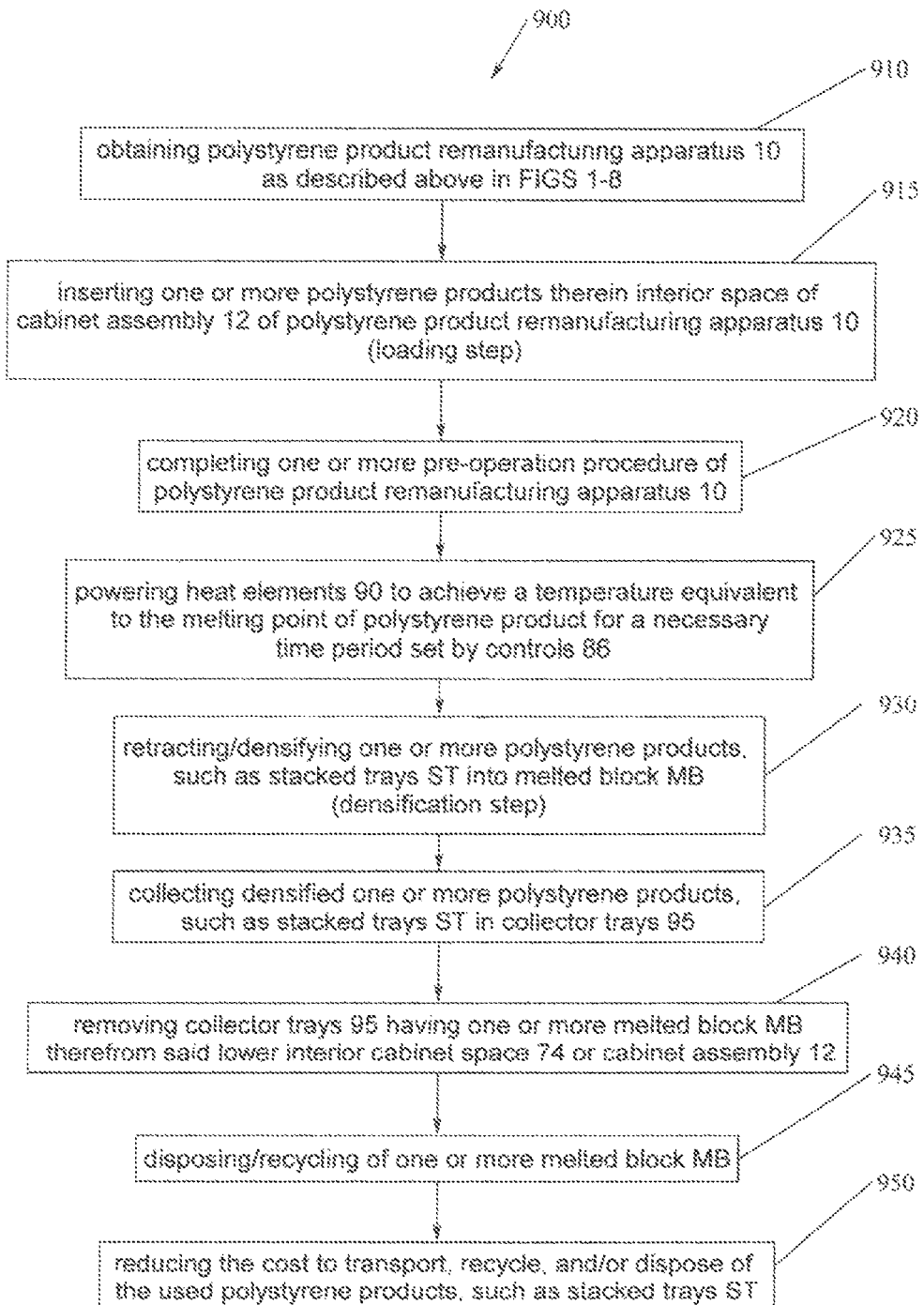
FIG. 9 is a flow diagram of a method of densifying and retracting polystyrene product.

Referring now to FIG. 9, there is illustrated a flow diagram 900 of a method densification of polystyrene products, such as stacked trays ST. In block or step 910, obtaining polystyrene product remanufacturing apparatus 10 as described above in FIGS. 1-8. In block or step 915, inserting one or more polystyrene products, such as stacked trays ST, therein polystyrene product remanufacturing apparatus 10 or more specifically therein upper interior cabinet space 72 of cabinet assembly 12 (loading step). It is contemplated herein that stacked trays ST may be pre-stacked or otherwise non-organized prior to loading. In block or step 920, completing one or more pre-operation procedure, such as loading collector trays 95, such as first collector tray 95A and second collector tray 95B, closing doors, such as top door assembly 32 and bottom door assembly 34 and setting controls 86 configured to operate polystyrene product remanufacturing apparatus 10. In block or step 925, powering heat elements 90 to achieve a temperature equivalent to the melting point of stacked trays ST for a necessary time period set by controls 86. In block or step 930, retracting/densifying one or more polystyrene products, such as stacked trays ST into melted block MB. In block or step 935, collecting densified one or more polystyrene products, such as stacked trays ST in collector trays 95, such as first collector tray 95A and second collector tray 95B. In block or step 940, removing collector trays 95, such as first collector tray 95A and second collector tray 95B having one or more melted block MB therefrom said lower interior cabinet space 74 or cabinet assembly 12. In block or step 945, disposing/recycling of one or more melted block MB. In block or step 950, reducing the cost to transport, recycle, and/or dispose of the used polystyrene products, such as stacked trays ST.

The foregoing description and drawings comprise illustrative embodiments of the present invention. Having thus described exemplary embodiments, it should be noted by those ordinarily skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one ordinarily skilled in the art to which this invention pertains having the benefit of the teachings presented in the foregoing descriptions and the associated drawings. Although specific terms may be employed herein, they are used in a generic and descriptive sense only and not for purposes of limitation. Moreover, the present invention has been described in detail; it should be understood that various changes, substitutions and alterations can be made thereto without departing from the spirit and scope of the invention as defined by the appended claims. Accordingly, the present invention is not limited to the specific embodiments illustrated herein, but is limited only by the following claims.

What is claimed is:

1. An apparatus for the densification of a plurality of thermoplastics, the apparatus comprising:
   a cabinet assembly having a plurality of side walls, a top, and a bottom, said cabinet assembly configured to create an interior space;
   at least one door configured to provide access to said interior space, said interior space having an upper interior space and a lower interior space, said upper interior space is configured to receive the plurality of thermoplastics and said lower interior space is configured to receive two or more collector trays;
   at least one door assembly configured to enable access thereto said interior space;
   a plurality of radiant heat sources configured for controlled temperature in said interior space; and
   wherein said plurality of radiant heat sources includes one or more upper radiant heat source positioned to radiate heat from an upper portion of said interior space adjacent said top, said plurality of radiant heat sources further includes one or more lower radiant heat source positioned to radiate heat from a lower portion of said interior space adjacent said bottom, and said plurality of radiant heat sources still further includes at least one middle radiant heat source having a cover, said at least one middle radiant heat source positioned to radiate heat from a center portion of said interior space adjacent a point between said top and said bottom and adjacent a point between two of said two or more collector trays.

2. The apparatus of claim 1, wherein said plurality of side walls further comprises a front panel.

3. The apparatus of claim 2, wherein said at least one door further comprises an upper door configured to be releasably hinged to said front panel.

4. The apparatus of claim 3, wherein said upper door is configured to enable access thereto said upper interior space of said interior space.

5. The apparatus of claim 4, wherein said upper interior space is configured to receive the plurality of the thermoplastics.

6. The apparatus of claim 5, wherein said at least one door further comprises a lower door configured to be releasably hinged to said front panel.

7. The apparatus of claim 6, wherein said lower door is configured to enable access thereto said lower interior space of said interior space.

8. The apparatus of claim 1, wherein said plurality of radiant heat sources is configured to supply sufficient heat to cause the plurality of the thermoplastics disposed therein said upper interior space to retract.

9. The apparatus of claim 1, wherein said cabinet assembly further comprises a controller configured to regulate said plurality of radiant heat elements to maintain temperature within said interior space.

10. The apparatus of claim 9, wherein said controller is configured to regulate said plurality of radiant heat elements for a time period.

11. The apparatus of claim 10, wherein said plurality of radiant heat elements retracts the plurality of thermoplastics positioned within said interior space to form a melted brick.

12. The apparatus of claim 11, wherein said two or more collector trays amass densified thermoplastics.

13. The apparatus of claim 9, further comprising a solenoid door lock integral with said upper door and wherein said controller is configured to regulate said solenoid door lock.

14. The apparatus of claim 13, further comprising a vent, said vent configured to exhaust said interior space.

15. The apparatus of claim 14, wherein said plurality of side walls, said top, and said bottom further comprises insulation configured to reduce heat transfer from said cabinet assembly.

* * * * *